United States Patent
Zhuo et al.

(10) Patent No.: US 11,048,600 B2
(45) Date of Patent: Jun. 29, 2021

(54) METHOD AND APPARATUS FOR MANAGING STORAGE SYSTEM

(71) Applicant: EMC IP Holding Company LLC, Hopkinton, MA (US)

(72) Inventors: Baote Zhuo, Beijing (CN); Geng Han, Beijing (CN); Weihua Li, Beijing (CN); Xinlei Xu, Beijing (CN); Changyu Feng, Beijing (CN); Haiying Tang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 108 days.

(21) Appl. No.: 16/250,116

(22) Filed: Jan. 17, 2019

(65) Prior Publication Data
US 2019/0220378 A1 Jul. 18, 2019

(30) Foreign Application Priority Data

Jan. 18, 2018 (CN) .......................... 201810048517.6

(51) Int. Cl.
*G06F 11/20* (2006.01)
*G06F 11/10* (2006.01)

(52) U.S. Cl.
CPC ...... *G06F 11/2094* (2013.01); *G06F 11/1076* (2013.01); *G06F 2201/82* (2013.01)

(58) Field of Classification Search
CPC ............. G06F 11/2094; G06F 2201/82; G06F 11/1076
See application file for complete search history.

(56) References Cited

U.S. PATENT DOCUMENTS

| | | | |
|---|---|---|---|
| 6,792,391 B1 | 9/2004 | Nanda | |
| 7,024,586 B2 | 4/2006 | Kleiman et al. | |
| 7,346,831 B1 * | 3/2008 | Corbett | G06F 11/1076 714/5.11 |
| 8,261,016 B1 * | 9/2012 | Goel | G06F 11/1088 711/114 |
| 8,799,705 B2 | 8/2014 | Hallak et al. | |
| 9,690,660 B1 * | 6/2017 | Robins | G06F 16/24578 |
| 9,990,263 B1 * | 6/2018 | Tian | G06F 11/2094 |
| 10,048,999 B2 | 8/2018 | Shu et al. | |
| 10,210,045 B1 * | 2/2019 | Gao | G06F 11/1076 |
| 10,409,682 B1 * | 9/2019 | Davies | G06F 11/1088 |

(Continued)

*Primary Examiner* — Bryce P Bonzo
*Assistant Examiner* — Michael Xu
(74) *Attorney, Agent, or Firm* — BainwoodHuang

(57) ABSTRACT

Techniques for managing a storage system involve: in response to a storage device in a group of storage devices failing, determining multiple stripes in the storage system which are associated with the failed storage device; selecting a first storage device and a second storage device from the group of storage devices respectively, the first storage device and the second storage device being a first candidate and a second candidate of storage devices for rebuilding a first stripe and a second stripe among the multiple stripes to form a first rebuilt stripe and a second rebuilt stripe respectively; obtaining a coupling degree between the first rebuilt stripe and the second rebuilt stripe, the coupling degree describing a conflict degree of rebuilding the first stripe and the second stripe in parallel; and identifying the first candidate and the second candidate on the basis of the obtained coupling degree.

22 Claims, 11 Drawing Sheets

(56) References Cited

U.S. PATENT DOCUMENTS

| | | | |
|---|---|---|---|
| 10,642,690 B1* | 5/2020 | Tian | G06F 3/0643 |
| 2012/0079318 A1* | 3/2012 | Colgrove | G06F 3/0646 |
| | | | 714/6.22 |
| 2017/0091018 A1* | 3/2017 | Shu | G06F 11/0727 |

* cited by examiner

1000A

|  | RS0 | RS1 | RS2 | RS3 | RS5 | RS7 |
|---|---|---|---|---|---|---|
| RS0 | -1 | 8 | 6 | 10 | 7 | 8 |
| RS1 | 8 | -1 | 8 | 7 | 6 | 9 |
| RS2 | 6 | 8 | -1 | 10 | 9 | 7 |
| RS3 | 10 | 7 | 10 | -1 | 8 | 6 |
| RS5 | 7 | 6 | 9 | 8 | -1 | 10 |
| RS7 | 8 | 9 | 7 | 6 | 10 | -1 |

|  | RS0 | RS1 | RS2 | RS3 | RS5 | RS7 |
|---|---|---|---|---|---|---|
| RS0 | -1 | 8 | 6 | 10 | 7 | 8 |
| RS1 | 8 | -1 | 8 | 7 | 6 | 9 |
| RS2 | 6 | 8 | -1 | 10 | 9 | 7 |
| RS3 | 10 | 7 | 10 | -1 | 8 | 6 |
| RS5 | 7 | 6 | 9 | 8 | -1 | 10 |
| RS7 | 8 | 9 | 7 | 6 | 10 | -1 |

FIG. 10B

METHOD AND APPARATUS FOR MANAGING STORAGE SYSTEM

FIELD

Various implementations of the present disclosure relate to storage management, and more specifically, to a method and apparatus for managing a storage system (e.g. Redundant Array of Independent Disks (RAID)), as well as a computer program product.

BACKGROUND

With the development of data storage techniques, various data storage devices now provide users with higher and higher data storage capacity, and also their data access speed has been increased greatly. With the increase of data storage capacity, users also impose greater demands on data reliability and response time of storage systems. So far various data storage systems based on redundant arrays of disks have been developed for improving reliability of data. When one or more disks in a storage system fail(s), data in failed disk(s) can be recovered from other normal disk.

Mapped Redundant Array of Independent Disks (mapped RAID) has been developed so far. In the mapped RAID, a disk is a logical concept and may include multiple extents that may be distributed over different physical storage devices in a resource pool. Regarding multiple extents in one stripe of the mapped RAID, they may be distributed over different physical storage devices, so that when a physical storage device where one extent among the multiple extents resides fails, data may be recovered from a physical storage device where other extent resides.

A rebuilt operation will involve huge access operations to a corresponding storage device in the resource pool. Due to the restriction of access bandwidth of a storage device, how to choose a storage device for the rebuild operation (i.e. to which place extents in a failed storage device will be rebuilt) becomes a technical problem for a to-be-rebuilt stripe. Further, where storage devices have been chosen for recovering various to-be-rebuilt stripes in the storage system, how to rebuild multiple extents in parallel as far as possible is also a technical problem.

SUMMARY

Therefore, it is desirable to develop and implement a technical solution for managing a storage system more effectively. It is desired that the technical solution can be compatible with existing storage systems and manage data in existing storage systems more effectively by changing various configurations of these storage systems.

In one implementation of the present disclosure, provided is a method for managing a storage system. The method includes: in response to a storage device in a group of storage devices failing, determining multiple stripes in the storage system which are associated with the failed storage device; selecting a first storage device and a second storage device from the group of storage devices respectively, the first storage device and the second storage device being a first candidate and a second candidate of storage devices for rebuilding a first stripe and a second stripe among the multiple stripes to form a first rebuilt stripe and a second rebuilt stripe respectively; obtaining a coupling degree between the first rebuilt stripe and the second rebuilt stripe, the coupling degree describing a conflict degree of rebuilding the first stripe and the second stripe in parallel; and identifying the first candidate and the second candidate on the basis of the obtained coupling degree.

In one implementation of the present disclosure, provided is an apparatus for managing a storage system, including: one or more processors; a memory coupled to at least one processor of the one or more processors; computer program instructions stored in the memory which, when executed by the at least one processor, cause the apparatus to execute a method for managing a storage system. The storage system includes multiple stripes, one stripe among the multiple stripes including multiple extents from a group of storage devices in a resource pool associated with the storage system. The method includes: in response to a storage device in the group of storage devices failing, determining multiple stripes in the storage system which are associated with the failed storage device; selecting a first storage device and a second storage device from the group of storage devices respectively, the first storage device and the second storage device being a first candidate and a second candidate of storage devices for rebuilding a first stripe and a second stripe among the multiple stripes to form a first rebuilt stripe and a second rebuilt stripe respectively; obtaining a coupling degree between the first rebuilt stripe and the second rebuilt stripe, the coupling degree describing a conflict degree of rebuilding the first stripe and the second stripe in parallel; and identifying the first candidate and the second candidate on the basis of the obtained coupling degree.

In one implementation of the present disclosure, provided is a computer program product being tangibly stored on a non-transient computer readable medium and including machine executable instructions for executing actions of a method according to the present disclosure.

With such techniques, a storage device leading to a lower coupling degree may be selected for a rebuild. Accordingly, there is improved storage system management.

BRIEF DESCRIPTION OF THE SEVERAL VIEWS OF THE DRAWINGS

Through the more detailed description in the accompanying drawings, the above and other objects, features and advantages of the implementations of the present invention will become more apparent. Several implementations of the present invention are illustrated schematically and are not intended to limit the present invention. In the drawings:

FIGS. 10A and 10B schematically illustrate a diagram of a coupling degree relationship based on which stripes to be rebuilt in a first round and a second round are selected according to one implementation of the present disclosure.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
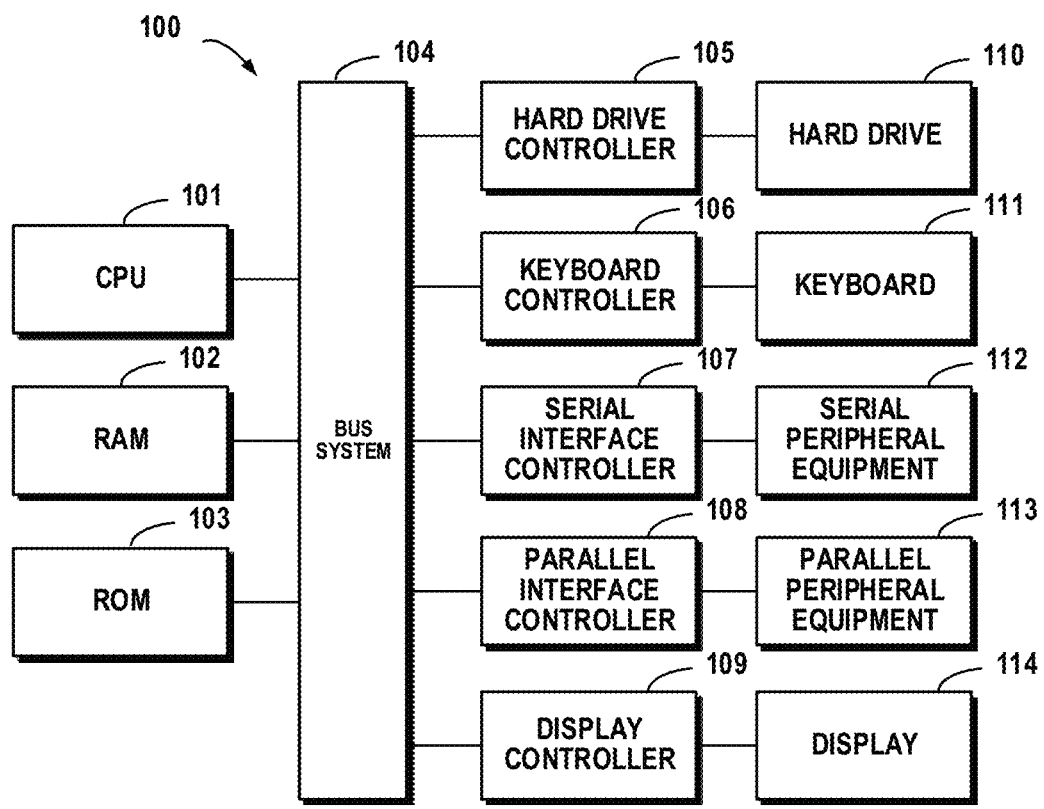
FIG. 1 schematically illustrates a block diagram of an example computer system which is applicable to implement the implementations of the present disclosure.

FIG. 1 illustrates an example computer system 100 which is applicable to implement the implementations of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is by way of example only rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or one implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) combines multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

Figure 2A:
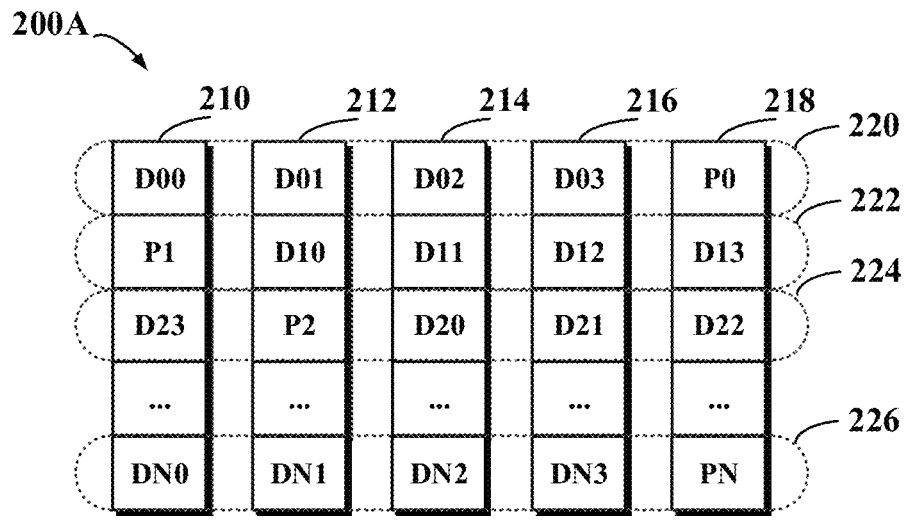
FIGS. 2A and 2B each schematically illustrate a view of an application environment where the implementations of the present disclosure may be implemented.

FIG. 2A schematically illustrates a schematic view 200A of a structure of RAID according to one technical solution. In this figure, working principles of RAID are illustrated by taking RAID-5 (4D+1P, where 4D represents that 4 storage devices are included in the storage system for storing data, and 1P represents that 1 storage device is included in the storage system for storing parity) that consists of five independent storage devices (210, 212, 214, 216 and 218) as an example. It should be noted although five storage devices are schematically shown in FIG. 2A, in other implementations more or less storage devices may be included according to different levels of RAID. Moreover, although in FIG. 2A there are shown stripes 220, 222, 224, . . . 226, in other examples the RAID system may further include a different number of stripes.

In RAID, a stripe crosses multiple physical storage devices (for example, the stripe 220 crosses storage the devices 210, 212, 214, 216 and 218). The stripe may be simply construed as a storage area among multiple storage devices which satisfies a given address range. Data stored in the stripe 220 includes multiple parts: a data block D00 stored in the storage device 210, a data block D01 stored in the storage device 212, a data block D02 stored in the storage device 214, a data block D03 stored in the storage device 216, and a data block P0 stored in the storage device 218. In this example, data blocks D00, D01, D02 and D03 are stored data, and data block P0 is a P parity of the stored data.

The mode of storing data in other stripes 222 and 224 is similar to that in the stripe 220, and the difference is that the parity about other data block may be stored in other storage device than the storage device 218. In this way, when one of the multiple storage devices 210, 212, 214, 216 and 218 fails, data in the failed device may be recovered from other normal storage devices.

Figure 2B:
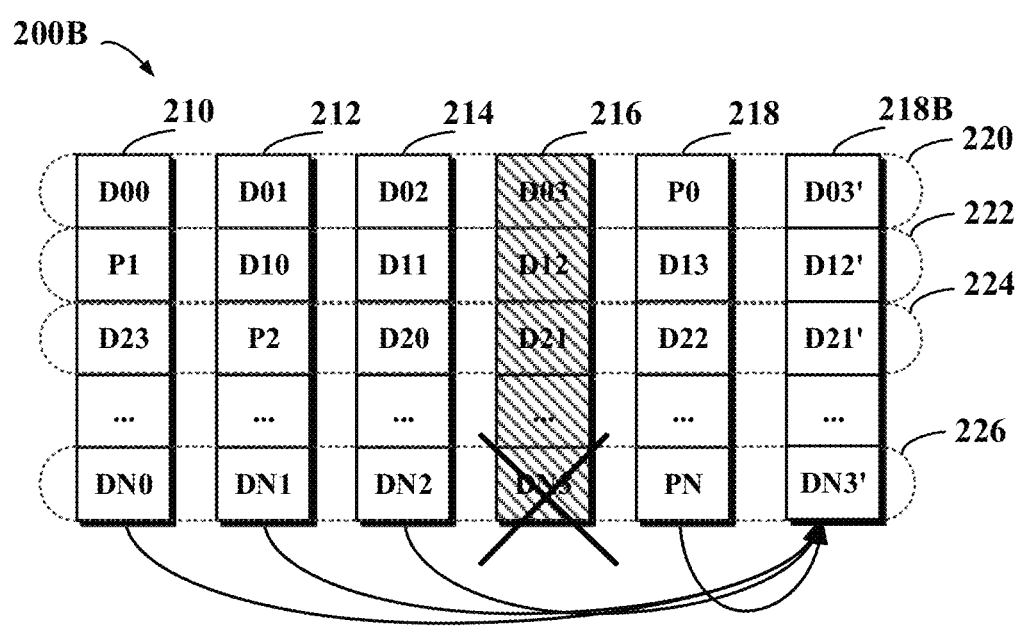

FIG. 2B schematically illustrates a schematic view 220B of rebuilding process of RAID according to one technical solution. As shown in FIG. 2B, when one storage device (e.g. the storage device 216 shown in shades) fails, data may be recovered from the other storage devices 210, 212, 214 and 218 that operate normally. At this point, a new standby storage device 218B may be added to RAID to replace the storage device 218. In this way, recovered data may be written to 218B, and system rebuilding may be realized.

While a RAID-5 storage system including 5 storage devices (among which 4 storage devices are used for storing data and 1 storage device is used for storing parity) has been described with reference to FIGS. 2A and 2B, according to definition of other RAID levels, there may further exist a storage system including a different number of storage devices. On the basis of definition of RAID 6, for example, two storage devices may be used to store parity P and Q respectively. For another example, according to definition of triple-parity RAID, three storage devices may be used to store parity P, Q and R respectively.

Note throughout the context of the present invention, a 4D+1P RAID-5 storage system is taken as an example of a storage system including multiple storage devices. When other RAID level is used, those skilled in the art may implement concrete details based on the above described principles. For example, in a 4D+2P RAID-6 storage system, 4 storage devices are used for storing data, and 2 storage devices are used for storing parity. In a 4D+3P triple-parity RAID, 4 storage devices are used for storing data, and 3 storage devices are used for storing parity.

Figure 3:
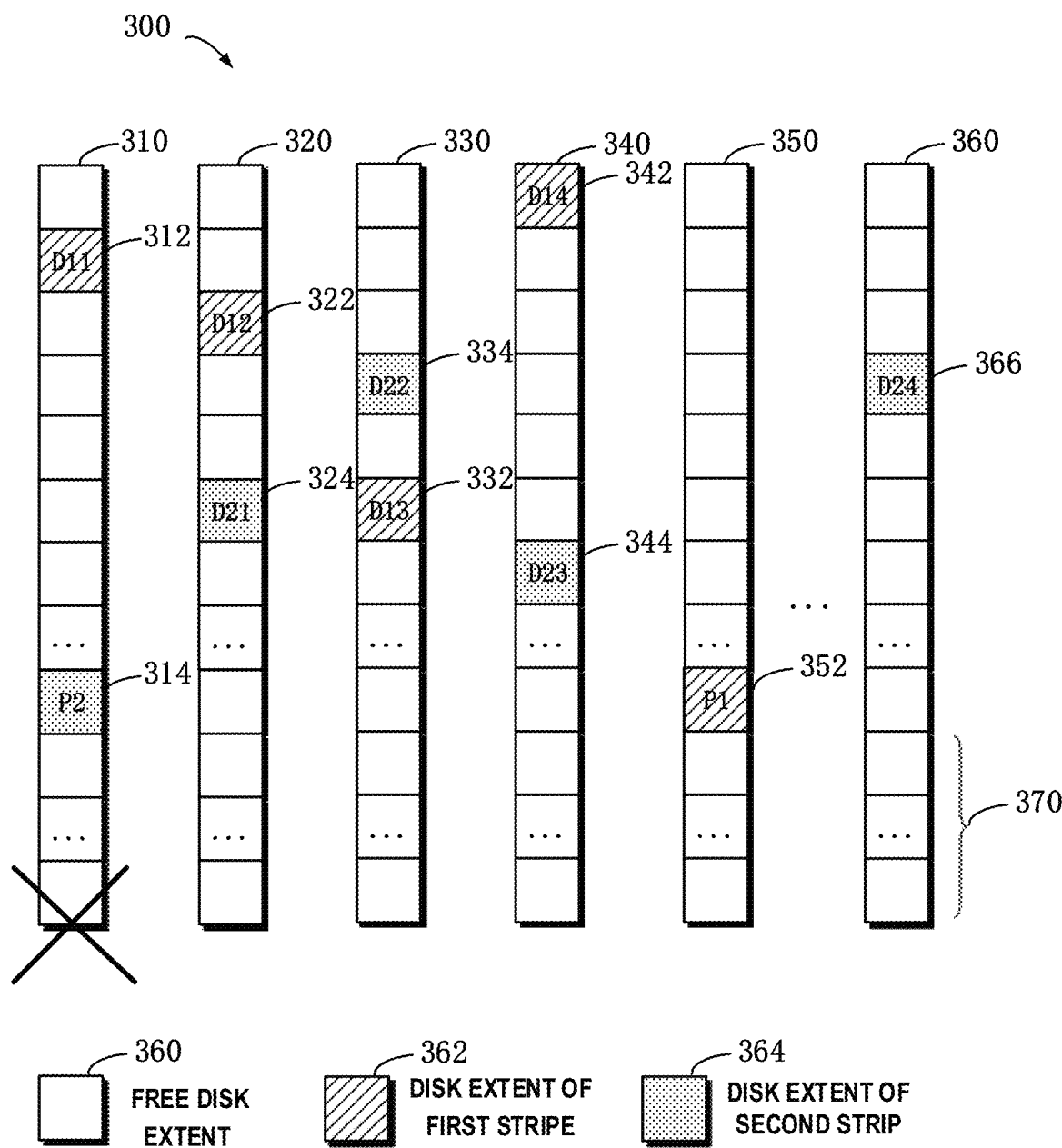
FIG. 3 schematically illustrates a diagram of storage devices in a resource pool associated with a storage system.

FIG. 3 schematically shows a diagram of a resource pool 300 associated with a storage system. This figure schematically shows multiple storage devices 310, 320, 330, 340, . . . , 350 and 360. Each storage device may include multiple extents, among which a blank extent 360 represents a free extent, an extent 362 shown with stripes represents an extent for a first stripe, and an extent 364 shown in shades represents an extent for a second stripe. At this point, extents 312, 322, 332, 342 and 352 for the first stripe are for storing data blocks D11, D12, D13, D14 and parity P1 of the first stripe respectively. Extents 324, 334, 344, 366 and 314 for the second stripe are for storing blocks D21, D22, D23, D24 and parity P2 of the second stripe respectively.

As shown in FIG. 3, there may exist a reserved free portion 370 in each storage device, so that when a storage device in the resource pool fails, extents in the free portion 370 in each storage device may be selected to rebuild various extents in the failed storage device.

Note in FIG. 3 the 4D+1P RAID-5 storage system is taken as an example to illustrate how extents in various stripes are uniformly distributed over multiple storage systems in the resource pool. When RAID based on other level is used, those skilled in the art may implement concrete details based on the above described principles. For example, in the 6D+2P RAID-6 storage system, 8 extents in each stripe may be uniformly distributed over multiple storage devices so as to ensure a load balance between the multiple storage devices.

An example where multiple extents in two stripes are distributed over multiple storage devices has been illustrated with reference to FIG. 3. When mapped RAID includes more storage devices, the number of possible distribution patterns will increase greatly. In order to guarantee a load balance between various physical storage devices in the resource pool, it is desired that extents in various stripes in the storage system are uniformly distributed over various physical storage devices in the resource pool as far as possible.

When a storage device in the resource pool fails, a storage system associated with the failed storage device needs to be rebuilt. During the rebuild of the storage system, on the one hand, it is necessary to consider selecting a storage device which may cause loads of various storage devices to be balanced; on the other hand, how to execute a parallel rebuild as far as possible needs to be further considered. However, existing rebuild schemes do not take into consideration the parallel efficiency during a rebuild, whereas such a problem might arise that the response speed is reduced when a certain storage device is accessed a lot.

Figure 4:
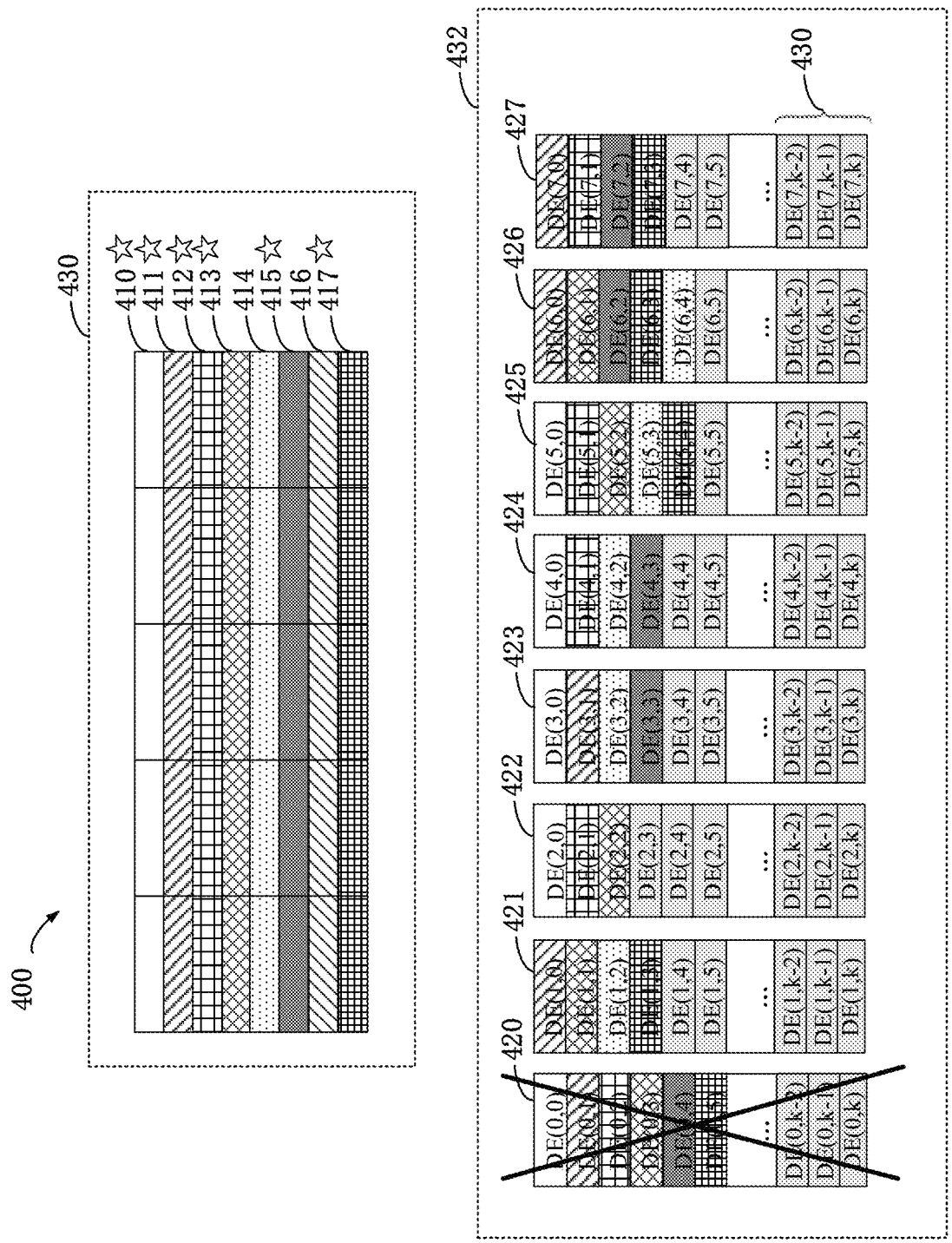
FIG. 4 schematically illustrates an architecture view for managing a storage system according to one implementation of the present disclosure.

To solve the foregoing drawbacks, implementations of the present disclosure provide a method, apparatus and program product for managing a storage system. Specifically, according to one implementation of the present disclosure, provided is a technical solution for managing a storage system. FIG. 4 schematically shows an architecture view 400 for managing a storage system according to one implementation of the present disclosure. In this implementation, a storage device in the resource pool to which extents in a failed storage device will be rebuilt is determined (or identified) by considering a coupling degree between two stripes.

For the purpose of description, only a 4D+1P mapped storage system 430 is taken as an example. As shown in FIG. 4, the storage system 430 may include multiple (e.g. 8) stripes 410 to 417, and each stripe may include 5 extents (4D+1P). A resource pool associated with the storage system 430 may include multiple storage devices (e.g. 8) 420 to 427.

Note the number of stripes in the storage system 430 and the number of storage devices in the resource pool 432 as shown in FIG. 4 are merely illustrative. According to an example implementation of the present disclosure, a further number of stripes and storage devices may be involved. According to an example implementation of the present disclosure, there is proposed such a concept as coupling degree between stripes, which coupling degree may represent a conflict degree between two stripes during a rebuild.

It will be appreciated in the 4D+1P storage system, when a storage device where an extent in a stripe resides fails, data in a normal extent in the stripe needs to be read, and data in the failed extent is then rebuilt on the basis of read data. Subsequently, rebuilt data may be written to a free extent in a further storage device in the resource pool. At this point, the rebuild process will involve reading data from 4 normal extents and writing data into the free extent.

Illustration is presented below to the concept of coupling degree on the basis of two scenarios. Scenario 1: suppose 4 normal extents of a to-be-rebuilt stripe reside on storage devices 1-4 respectively, and 4 normal extents of a further to-be-rebuilt stripe also reside on the four storage devices 1-4 respectively. Further, suppose two free extents are selected from a same storage device 5 to rebuild the two stripes, and then a serious conflict will occur during the rebuild. In other words, during the rebuild, two rebuild threads will read data in the four storage devices 1-4 in parallel and subsequently write rebuilt data to the same target storage device in parallel. Since there is a serious overlap between storage devices associated with each to-be-rebuilt stripe, an access conflict will occur between two rebuild threads in read from and write to the same storage device.

Scenario 2: suppose 4 normal extents of two to-be-rebuilt stripes reside on 8 different storage devices, and two free extents are selected from two different target storage devices to rebuild the two stripes, then no read and write conflict will occur during the rebuild. In other words, during the rebuild, two rebuild threads will read data from four different storage devices and write rebuilt data to two different target storage devices respectively. Since there is no overlap between storage devices associated with each to-be-rebuilt stripe, no access conflict will occur between two rebuild threads in read from and write to the same storage device.

In view of the foregoing consideration, according to an example implementation of the present disclosure, there is provided a technical solution for selecting, based on a coupling degree between two stripes, a storage device to which an extent associated with a failed storage device will be rebuilt. With reference to a flowchart in FIG. 5, illustration is presented below to detailed steps of a method for managing a storage system.

Figure 5:
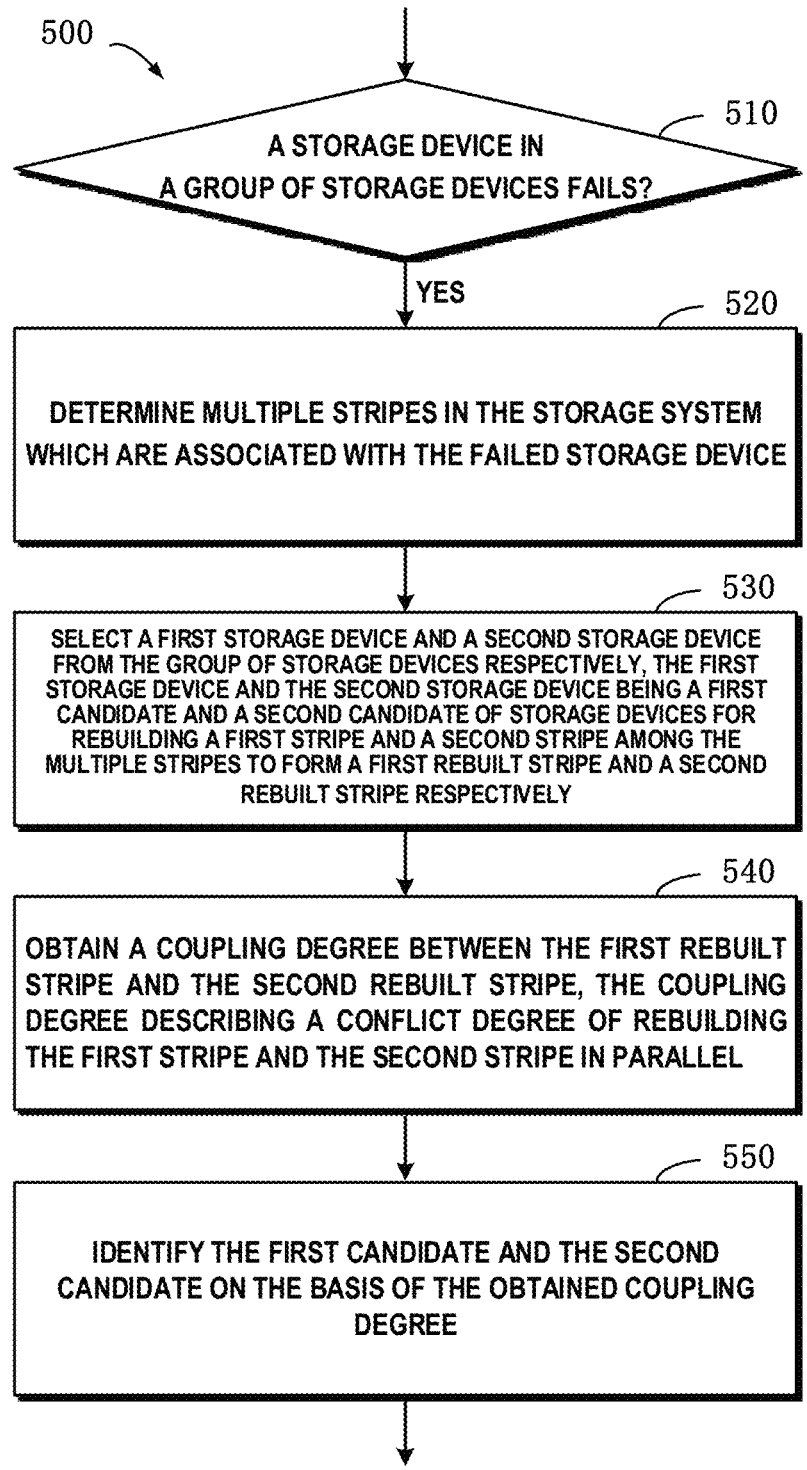
FIG. 5 schematically illustrates a flowchart of a method for managing a storage system according to one implementation of the present disclosure.

FIG. 5 schematically shows a flowchart of a method 500 for managing a storage system according to one implementation of the present disclosure. In block 510, whether a storage device in a group of storage devices fails or not is judged. If the judgment result is "yes," then in block 520, multiple stripes in the storage system which are associated with the failed storage device are determined. As shown in FIG. 4, suppose the storage device 420 in the group of storage devices 420 to 427 fails, and then multiple stripes in the storage system 430 which are associated with the failed storage device 420 may be determined. In the storage system 430, extents with the same pattern represent extents in the same stripe. For example, blank patterns show extents in the stripe 410, slash patterns show extents in the stripe 411, grid patterns show extents in the stripe 412, and so on and so forth. In the resource pool 432, each storage device may include multiple extents. For example, the storage device 420 may include k extents, which are identified as DE (0,0), DE (0,1), . . . , DE (0,k−2), DE (0,k−1) and DE (0,k) respectively.

According to an example implementation of the present disclosure, an extent may be identified as DE (x,y), wherein x denotes the number of a storage device where the extent resides, and y denotes the position of the extent in the storage device. Specifically, DE (0,0) represents the extent is in the 0 position in the 0 storage device 0, and DE (0,k−2) represents the extent is in the k−2 position in the 0 storage device. As shown in FIG. 4, the last three extents (positions k−2 to k as shown by a reserved portion 430) in each storage devices are reserved free extents. When one storage device 420 in the resource pool 432 fails, extents in the failed storage device 420 may be rebuilt to the reserved portion 430.

As shown in FIG. 4, the storage device 420 fails, at which point it may be determined the extents DE (0,0), DE (0,1), . . . , DE (0,2), DE (0,3) and DE (0,4) in the failed storage device 420 resides in the stripes 410, 411, 412, 415 and 417 respectively (shown in stars).

In block 530 in FIG. 5, a first storage device and a second storage device may be selected from the group of storage devices 421 to 427. It will be appreciated the first storage device and the second storage device are a first candidate and a second candidate of storage devices for rebuilding a first stripe and a second stripe among multiple stripes to form a first rebuilt stripe and a second rebuilt stripe respectively. Returning to FIG. 4, in order to rebuild the extent DE (0,0) in the stripe 410, the storage device 421 may be selected from normal storage devices in the resource pool at random, in order or in other way. To rebuild the extent DE (0,1) in the stripe 411, a normal storage device (e.g. the storage device 422) may further be selected similarly.

It will be appreciated principles of RAID should be followed in selecting a storage device for a rebuild. In other words, the storage device for a rebuild should be selected from normal storage devices in the resource pool 432 which do not include an extent in the to-be-rebuilt stripe. Specifically, as shown in FIG. 4, extents included in the stripe 410 reside on the storage devices 420, 422, 423, 424 and 425 respectively. When the storage device 420 fails, the storage device for a rebuild should be selected from the storage devices 421, 426 and 427.

In block 540 in FIG. 5, a coupling degree between the first rebuilt stripe and the second rebuilt stripe is determined, the coupling degree describing a conflict degree between the first stripe and the second stripe when being rebuilt in parallel. Here, the rebuilt stripe refers to a stripe that will be generated by a rebuild using a selected storage device. For example, a rebuilt stripe corresponding to the stripe 410 will include: the extent DE (1,k−2) used for a rebuild and selected from the storage device 421, as well as the extents DE (2,1), DE (3,0), DE (4,0) and DE (5,0) that remain in the stripe 410. For another example, a rebuilt stripe corresponding to the stripe 411 will include: the extent DE (2,k−2) used for a rebuild and selected from the storage device 422, as well as the extents DE (1,0), DE (3,1), DE (6,0) and DE (7,0) that remain in the stripe 411. The coupling degree between two rebuilt stripes may be determined on the basis of a relationship between various extents in the two rebuilt stripes.

Finally in block 550, the first candidate and the second candidate may be determined on the basis of the determined coupling degree. Here since the coupling degree represents a conflict degree during the rebuild, first and second candidates may be selected as appropriate as possible so that the coupling degree between two rebuilt stripes is made lower.

Figure 6:
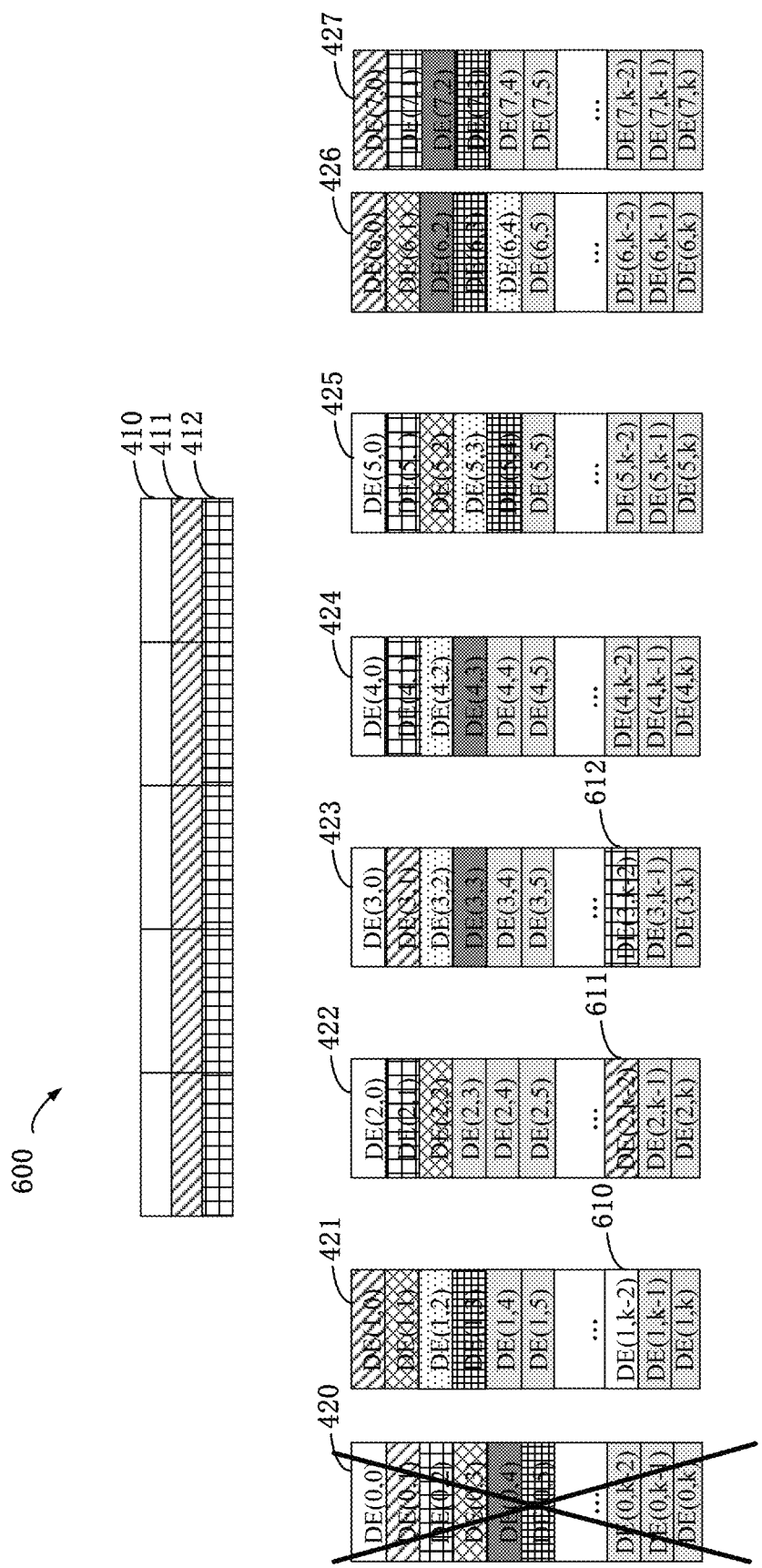
FIG. 6 schematically illustrates a diagram for determining a coupling degree between a first rebuilt stripe and a second rebuilt stripe according to one implementation of the present disclosure.

With reference to FIG. 6, description is presented below to more details of determining (or ascertaining) a coupling degree. FIG. 6 schematically shows a diagram 600 for determining a coupling degree between a first rebuilt stripe and a second rebuilt stripe according to one implementation of the present disclosure. Continuing the example in FIG. 4, suppose an extent 610 (whose identifier is DE (1,k−2)) is selected from the storage device 421 to rebuild the stripe 410, an extent 611 (whose identifier is DE (2,k−2)) is selected from the storage device 422 to rebuild the stripe 411, and an extent 612 (whose identifier is DE (2,k−2)) is selected from the storage device 423 to rebuild the stripe 412. At this point, the first rebuilt stripe and the second rebuilt stripe may be respectively represented as below:

First rebuilt stripe={DE (1,k−2), DE (2,0), DE (3,0), DE (4,0), DE (5,0)}

Second rebuilt stripe={DE (1,0), DE (2,k−2), DE (3,1), DE (6,0), DE (7,0)}

According to an example implementation of the present disclosure, the coupling degree is determined on the basis of addresses of various extents included in the first rebuilt stripe and addresses of various extents included in the second rebuilt stripe. According to the example implementation of the present disclosure, on which storage device each extent in a stripe resides will impact an access speed of accessing the storage device during the rebuild. Therefore, the coupling degree may be determined on the basis of addresses of various extents (e.g. represented by identifiers). Conflicts caused to a storage device when accessed by different rebuild operations during the rebuild may be taken into consideration, so the conflict degree during the rebuild may be measured more accurately.

With reference to the first rebuilt stripe and the second rebuilt stripe described above, as seen from addresses of extents in the two stripes, extents in the first rebuilt stripe reside on storage devices No. 1, 2, 3, 4 and 5 respectively, and extents in the second rebuilt stripe reside on storage devices No. 1, 2, 3, 6 and 7 respectively. At this point, the three storage devices No. 1, 2 and 3 have to provide extents for both the first rebuilt stripe and the second rebuilt stripe (in other words, the three storage devices No. 1, 2 and 3 overlap between the first rebuilt stripe and the second rebuilt stripe). Thereby, it may be considered that parallel read and write operations to the three storage devices No. 1, 2 and 3 will lead to certain conflicts during the rebuild.

According to an example implementation of the present disclosure, the coupling degree between two rebuilt stripes may be measured quantitatively. For example, the coupling degree may be determined on the basis whether extents in two rebuilt stripe reside on the same storage device(s) or not. If 10 extents in two stripes reside on different storage devices respectively, then the coupling degree may be set to 0 (or other value).

If one pair of extents in two stripes reside on the same storage device (for example, both the extent DE (1,k−2) in the first rebuilt stripe and the extent DE (1,0) in the second rebuilt stripe reside on the storage device 421), then the coupling degree may be increased by 1 (or other value). Specifically, the coupling degree may be determined on the basis of the number of overlapping storage devices involved by the two rebuilt stripes. As shown in FIG. 6, the first rebuilt stripe and the second rebuilt stripe include three overlapping storage devices (the storage devices No. 1, 2 and 3), and then the coupling degree between the two stripes may be set to 3. At this point, the coupling degree may be calculated on the basis of Formula 1 below:

$CP(RSi, RSj)$=the number of overlapping storage devices included in rebuilt stripe $RSi$ and rebuilt stripe $RSj$      Formula 1

It will be appreciated that a specific example of the coupling degree between rebuilt stripes associated with the stripes 410 and 411 has been illustrated. Those skilled in the art may further determine (or identify) the coupling degree between rebuilt stripes associated with the stripes 410 and 412 (or other to-be-rebuilt stripes) according to the principle described above. It will be appreciated that an example for calculating the coupling degree has been presented for the illustration purpose only, and the coupling degree may further be determined in other way. For example, a different weight may be set for each overlapping storage device according to concrete situation.

According to an example implementation of the present disclosure, the coupling degree may be determined on the basis of a read and write relationship between various extents included in the first rebuilt stripe and a read and write relationship between various extents included in the second rebuilt stripe. According to the example implementation of the present disclosure, the conflict degree of access to a storage device further depends on the type of access. For example, since the performance of read access is higher than that of write access (e.g. twice), the conflict degree may be measured more accurately by determining the coupling degree on the basis of a read and write relationship. For example, the coupling degree between two rebuilt stripes may be determined using weights shown in Table 1 below.

TABLE 1

Example for Calculating Coupling Degree

| No. | Operation Type | Operation Type | Weight |
|---|---|---|---|
| 1 | none | none | 0 |
| 2 | read | none | 0 |
| 3 | write | none | 0 |
| 4 | none | read | 0 |
| 5 | none | write | 0 |
| 6 | read | read | 2 |
| 7 | read | write | 3 |
| 8 | write | read | 3 |
| 9 | write | write | 4 |

As shown in Table 1, the first column shows the type of operation to an extent in the first rebuilt stripe, and the second column shows the type of operation to an extent in the second rebuilt stripe. The $1^{st}$ to $5^{th}$ rows show the situation in which there is no overlapping extent between storage devices where extents in the first rebuilt stripe and the second rebuilt stripe reside, so weights are set to 0.

The $6^{th}$ row shows the situation in which storage devices where extents in the first rebuilt stripe and the second rebuilt stripe reside overlap: a read operation is performed to an overlapping storage device in order to rebuild the first stripe, and a read operation is performed to the overlapping storage device in order to rebuild the second stripe. At this point the weight may be set to 2.

The $7^{th}$ row shows the situation in which storage devices where extents in the first rebuilt stripe and the second rebuilt stripe reside overlap: a read operation is performed to an overlapping storage device in order to rebuild the first stripe, and a write operation is performed to the overlapping storage device in order to rebuild the second stripe. Since read efficiency is usually about 2 times write efficiency, the weight may be set to 1+2×1=3. The $8^{th}$ row shows the situation that is similar to the $7^{th}$ row and thus is ignored here.

The $9^{th}$ row shows the situation in which storage devices where extents in the first rebuilt stripe and the second rebuilt stripe reside overlap: a write operation is performed to an overlapping storage device in order to rebuild both the first stripe and the second stripe. Therefore, the weight may be set to 2×1+2×1=4.

According to an example implementation of the present disclosure, read or write type may further be added to the foregoing definition of the first rebuilt stripe and the second rebuilt stripe, and thus the first rebuilt stripe and the second rebuilt stripe may be represented in the form as below:

First rebuilt stripe={DE (1,k−2,write), DE (2,0,read), DE (3,0,read), DE (4,0,read), DE (5,0,read)}

Second rebuilt stripe={DE (1,0,read), DE (2,k−2,write), DE (3,1,read), DE (6,0,read), DE (7,0,read)}

In this example, the final coupling degree CP (first rebuilt stripe, second rebuilt stripe) may be determined on the basis of weights shown in Table 1 and read and write type involved during the rebuild. The two rebuilt stripes involve 3 overlapping storage devices, and relevant operations are as below: operation types involved in the storage device No. 1 are "write" and "read," operation types involved in the storage device No. 2 are "read" and "write," and operation types involved in the storage device No. 3 are "read" and "read." Therefore, the coupling degree may be calculated as CP (first rebuilt stripe, second rebuilt stripe)=3+3+2=8.

Based on the foregoing example, those skilled in the art may further determine a coupling degree between other rebuilt stripes. For example, suppose two rebuilt stripes involve 2 overlapping storage devices, and relevant operations are as below: operation types involved in the storage device No. 1 are "write" and "write," and operation types involved in the storage device No. 2 are "read" and "read." Then, the coupling degree may be calculated as 4+2=6.

According to an example implementation of the present disclosure, where the first storage device has been determined as the first candidate, a second storage device satisfying the following condition may be selected from the group of storage devices: a coupling degree between the first rebuilt stripe and a second rebuilt stripe which is formed on the basis of the second storage device is lower than a coupling degree between the first rebuilt stripe and a further rebuilt stripe which is formed on the basis of a further storage device. In other words, a storage device producing a lower coupling degree is selected as the second storage device, so the conflict degree during the rebuild may be reduced as far as possible.

Specifically, a reference storage device may be selected from the group of storage devices, the reference storage device being a reference candidate of a storage device for rebuilding the second stripe to form a reference rebuilt stripe. Then, a reference coupling degree between the first rebuilt stripe and the reference rebuilt stripe may be determined. Finally, if the coupling degree is less than the reference coupling degree, then the first storage device and the second storage device are identified as the first candidate and the second candidate respectively.

According to an example implementation of the present disclosure, for each storage device in the resource pool, a coupling degree between the first rebuilt stripe and a rebuilt stripe formed using each storage device may be calculated, and a storage device producing the lowest coupling degree may be selected as the second candidate. Still with reference to FIG. 6, in order to rebuild the stripes 410 and 411, where the storage device 421 has been determined for rebuilding the stripe 410, a storage device producing the smallest coupling degree may be sought among remaining available storage devices.

Specifically, first of all the storage device 422 may be selected to rebuild the stripe 411, and a coupling degree 1 is calculated; the storage device 424 may be selected to rebuild the stripe 411, and a coupling degree 2 is calculated; the storage device 425 may be selected to calculate a coupling degree 3. In this example, sizes of the coupling degrees 1 to 3 may be compared, and a storage device associated with the smallest coupling degree may be selected as a destination storage device for the rebuild operation. Alternatively, if multiple resultant coupling degrees are equal to one another, then a storage device may be selected at random or sequentially.

After the first stripe and the second stripe have been determined to be rebuilt to the first candidate storage device and the second candidate storage device by using the foregoing method, processing may be performed to various to-be-rebuilt stripes in the storage system one by one. According to an example implementation of the present disclosure, specifically, a third storage device may be selected from the group of storage devices, the third storage device being a third candidate of a storage device for rebuilding a third stripe among the multiple stripes to form a third rebuilt stripe. Then, a set coupling degree between the third rebuilt stripe and a set including the first rebuilt stripe and the second rebuilt stripe may be determined. In this example, the set coupling degree may be determined on the basis of a coupling degree between the third rebuilt stripe and the first rebuilt stripe and a coupling degree between the third rebuilt stripe and the second rebuilt stripe respectively. For example, the two coupling degrees as determined may be summated (or other operation like multiply) so as to determine the set coupling degree. Finally, the third candidate may be determined on the basis of the determined set coupling degree.

Like the foregoing method for determining the second rebuilt stripe, a storage device for rebuilding the third stripe may be selected from multiple available storage devices based on each storage device, and a corresponding coupling degree may be calculated for each storage device. By selecting a storage device producing the smallest coupling degree, it may be determined to where the third stripe will be rebuilt. When multiple stripes in the storage system need to be rebuilt, processing may be performed to each stripe, until a storage device for rebuilding is determined for each rebuilt stripe.

According to an example implementation of the present disclosure, a parallel index P may be set for indicating the number of stripes which can be rebuilt in parallel during a subsequent rebuild. A value of the parallel index P may be set according to various hardware indicators of the storage system. Generally the parallel index P may be set to 4, 8 or other value. For example, when P=4, this means 4 stripes may be rebuilt in parallel during one round of a rebuild. The rebuild may be performed in multiple rounds, until each to-be-rebuilt stripe in the storage system is processed.

Figure 7:
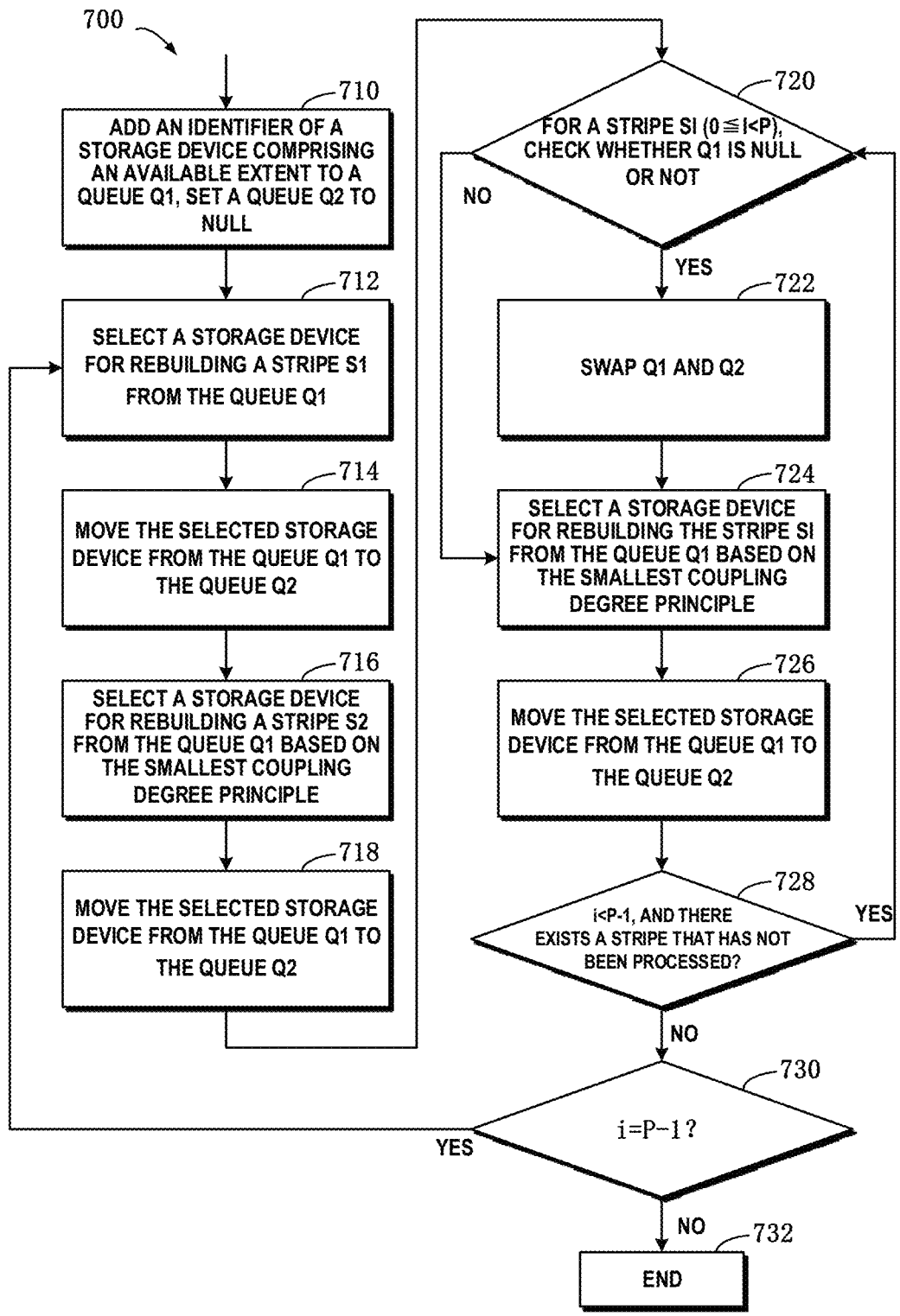
FIG. 7 schematically illustrates a flowchart of a method for determining various rebuilt stripes according to one implementation of the present disclosure.

According to an example implementation of the present disclosure, a storage device used for a rebuild may be determined for each to-be-rebuilt stripe. After the first candidate and the second candidate for rebuilding the first stripe and the second stripe respectively have been determined using the foregoing method, a storage device for rebuilding a further stripe may be gradually selected on the basis of the coupling degree. In this manner, it may be guaranteed that the access conflict at various storage devices in the resource pool is minimized during rebuilding various stripes. With reference to FIG. 7, description is presented below to how to select a storage device used for a rebuild with respect to various to-be-rebuilt stripes in the storage system.

FIG. 7 schematically shows a flowchart of a method 700 for determining various rebuilt stripes according to one implementation of the present disclosure. In this implementation, two respective queues Q1 and Q2 may be set, among which Q1 indicates an identifier of a storage device including a currently available extent, and Q2 indicates an identifier of a storage device which has been selected recently.

When selecting a storage device, an appropriate storage device may be selected from the queue Q1, and subsequently an identifier of the selected storage device may be added to the queue Q2. When Q1 is null, it may be exchanged with Q2. In this manner, it may be guaranteed a storage device, which has not been selected for a long time since the previous selection, is selected every time so as to ensure a load balance between various storage devices.

A detailed description is presented below to each step shown in the flowchart in FIG. 7. An initialization step is performed in block 710. First, an identifier of a storage device including an available extent is added to the queue Q1, and the queue Q2 is set to null. In subsequent blocks 712 to 728, storage devices for rebuilding P stripes in parallel may be selected from the resource pool according to the parallel index P one by one.

In block 712, a storage device suitable to rebuild a stripe S1 may be selected from the queue Q1. In block 714, the selected storage device may be moved from the queue Q1 to the queue Q2. Subsequently in block 716, based on the above smallest coupling degree criterion, a storage device for rebuilding a stripe S2 is selected from the queue Q1. Here the smallest coupling degree criterion refers to a storage device that causes a coupling degree between rebuilt stripes associated with the stripes S1 and S2 to be smallest is selected from the queue Q1. For more details of the smallest coupling degree, reference may be made to the foregoing description.

For the purpose of description, here a stripe being currently processed is called extent Si. As shown in block 718, the selected storage device is moved from the queue Q1 to the queue Q2. In block 720, it is checked whether the queue Q1 is null or not. If yes, then Q1 is exchanged with Q2 (as shown in block 722), or else the operation flow proceeds to block 724. In block 724, a storage device used for the stripe Si may be selected based on the foregoing smallest coupling degree criterion. In block 726, the selected storage device is moved from the queue Q1 to the queue Q2.

In block 728, it may be judged whether there exists a stripe which has not been processed. If yes, then the operation flow returns to block 720. Otherwise, the operation flow proceeds to block 730 to judge whether the number of processed stripes reaches the value of the parallel index P, and if yes, then the operation ends in block 730. If not, then the operation flow returns to block 712 to perform processing to the next to-be-rebuilt stripe.

With the method shown in FIG. 7, storage devices for rebuilding all to-be-rebuilt stripes in the storage system may be selected in multiple rounds. In each round, P stripes may be rebuilt in parallel. In this method, by setting the queues Q1 and Q2, a storage device, which has not been selected for a long time since the previous selection, may be selected for rebuilding the current stripe Si and further ensuring a load balance between various storage devices in the resource pool.

Figure 8:
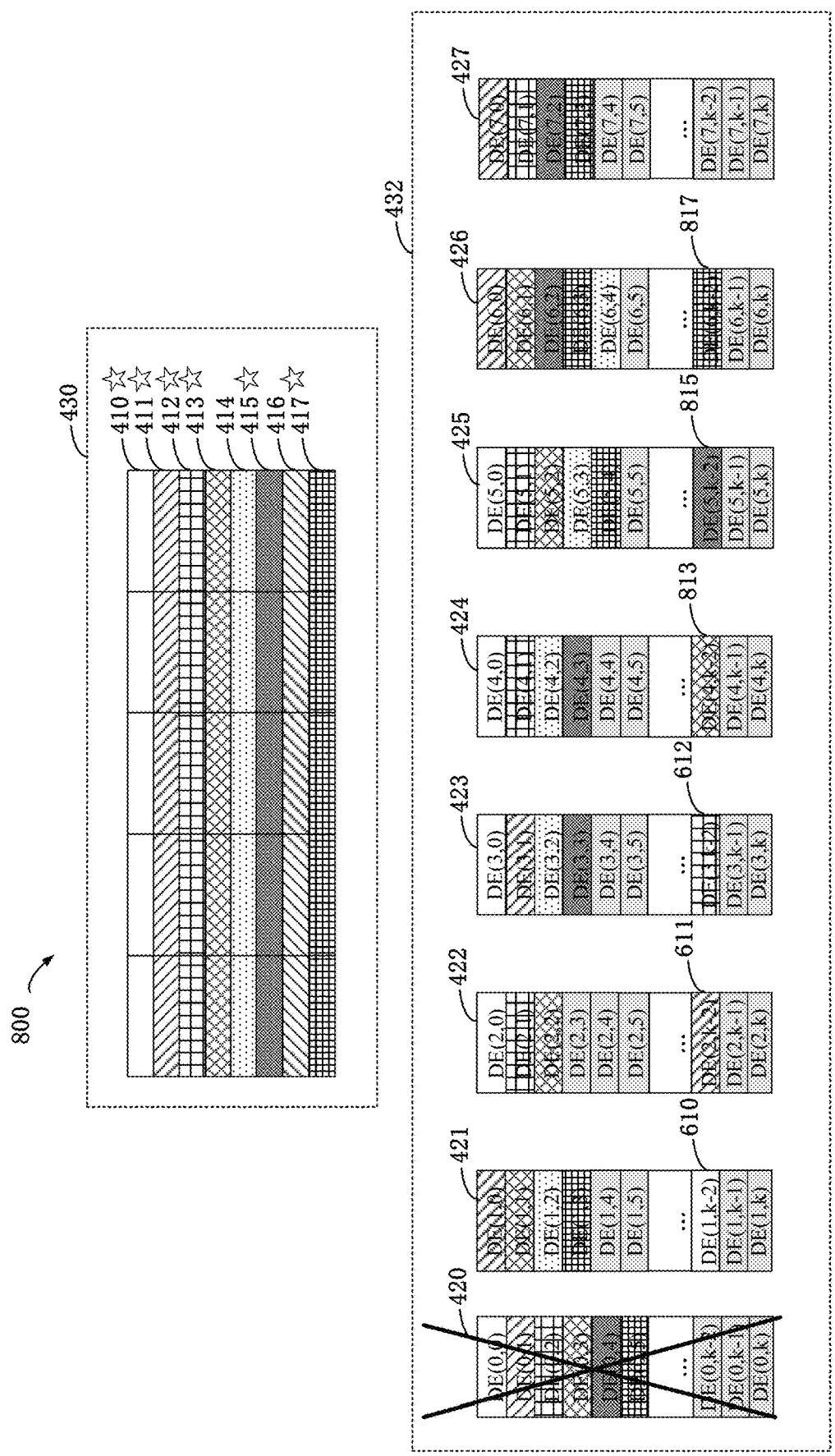
FIG. 8 schematically illustrates a diagram of storage devices for rebuilding various stripes as determined by the method shown in FIG. 7 according to one implementation of the present disclosure.

FIG. 8 schematically shows a view 800 of storage devices which are determined for rebuilding various stripes by the method shown in FIG. 7 according to one implementation of the present disclosure. As shown by a resource pool 432 in a lower portion of FIG. 8, when a storage device 420 in the resource pool fails, each extent included in the failed storage device 420 is damaged. Since damaged extents reside on multiple stripes in the storage system 430, these stripes need to be rebuilt. In the storage system 430, to-be-rebuilt stripes include 6 stripes, namely 410, 411, 412, 413, 415 and 417 shown with stars.

According to an example implementation of the present disclosure, candidate storage devices for rebuilding each stripe among the multiple stripes to form multiple rebuilt stripes are determined from the group of storage devices. According to the method shown in FIG. 7, a storage device used for the rebuild may be selected for each stripe one by one. After executing the method described with reference to FIG. 7, a storage device used for the rebuild has been selected for each to-be-rebuilt stripe in the storage system.

Specifically, as shown in the resource pool 432, the extent 610 in the storage device 421 will be used for rebuilding the stripe 410, the extent 611 in the storage device 422 will be used for rebuilding the stripe 411, the extent 612 in the storage device 423 will be used for rebuilding the stripe 412, an extent 813 in the storage device 424 will be used for rebuilding the stripe 413, an extent 815 in the storage device 425 will be used for rebuilding the stripe 415, and an extent in the storage device 426 will be used for rebuilding the stripe 417.

According to an example implementation of the present disclosure, a coupling degree relationship describing a coupling degree between any two rebuilt stripes among the multiple rebuilt stripes may be determined. Then, based on the coupling degree relationship, at least two stripes among the multiple stripes may be rebuilt in parallel. In this manner, by selecting a stripe on the basis of the coupling degree relationship, a lower conflict degree during the subsequent rebuild may be guaranteed.

Description is presented below to specific meaning of the coupling degree relationship. After it is determined which storage device will be used to rebuild a to-be-rebuilt stripe in the storage system, coupling degrees between various rebuilt stripes may be calculated using the foregoing method. For the purpose of description, various to-be-rebuilt stripes may be denoted by their numbers in the storage system, and a storage device selected for the rebuild by using the foregoing method is called "rebuilt stripe (abbreviated as RS)." For example, a rebuilt stripe RS0 represents a stripe which results from performing a rebuild operation to the stripe 410 (stripe No. 0 in the storage system) by using the extent 610 in FIG. 8, a rebuilt stripe RS1 represents a stripe which results from performing a rebuild operation to the stripe 411 (stripe No. 1 in the storage system) by using the extent 611 in FIG. 8, and so on and so forth.

Subsequently, coupling degrees between various rebuilt stripes may be determined by the foregoing method for determining a coupling degree. Specifically, coupling degrees between rebuilt stripes RS0, RS1, RS2, RS3, RS5 and RS7 may be as shown in Table 2 below.

TABLE 2

| Coupling Degree Relationship | | | | | | |
|---|---|---|---|---|---|---|
| | RS0 | RS1 | RS2 | RS3 | RS5 | RS7 |
| RS0 | −1 | 8 | 6 | 10 | 7 | 8 |
| RS1 | 8 | −1 | 8 | 7 | 6 | 9 |
| RS2 | 6 | 8 | −1 | 10 | 9 | 7 |
| RS3 | 10 | 7 | 10 | −1 | 8 | 6 |
| RS5 | 7 | 6 | 9 | 8 | −1 | 10 |
| RS7 | 8 | 9 | 7 | 6 | 10 | −1 |

In Table 2, the intersection of a row and a column corresponding to two rebuilt stripes represents a coupling degree between the two rebuilt stripes. As shown by the $2^{nd}$ row in Table 2, coupling degrees between the rebuilt stripe RS0 and the rebuilt stripes RS0, RS1, RS2, RS3, RS5 and RS7 are −1 (a coupling degree between the rebuilt stripe RS0 and itself is meaningless and hence may be set to −1 or other negative number), 8, 6, 10, 7 and 8 respectively.

Next, which stripes are selected for a parallel rebuild may be determined using the coupling degree relationship shown in Table 2. Note in this implementation, the number of stripes to be rebuilt in parallel is supposed to be determined on the basis of the foregoing parallel index P. Where the parallel index=2, two stripes may be rebuilt in parallel. Continuing the foregoing example, description is presented below to concrete operations where the parallel index P=4. At this point, 4 stripes may be selected to be rebuilt in parallel in one round. Based on coupling degrees shown in Table 2, P stripes whose coupling degrees are smallest may be selected for a parallel rebuild.

According to an example implementation of the present disclosure, the storage system includes a first control node and a second control node. At least two stripes among the multiple stripes may be rebuilt in parallel as below: at least two stripes are selected from the multiple stripes based on the coupling degree relationship; and a first portion and a second portion in the at least two stripes are rebuilt in parallel by using the first control node and the second control node respectively. Description has been presented above to how to select a storage device, which may reduce the conflict degree during the rebuild, from storage devices for each to-be-rebuilt stripe. Based on a correspondence between a determined stripe and a storage device, the rebuild operation may be executed in parallel by two control nodes in the storage system. In this manner, the parallel execution degree of the rebuild operation may be improved further, and the rebuild may be completed at a faster speed.

Figure 9:
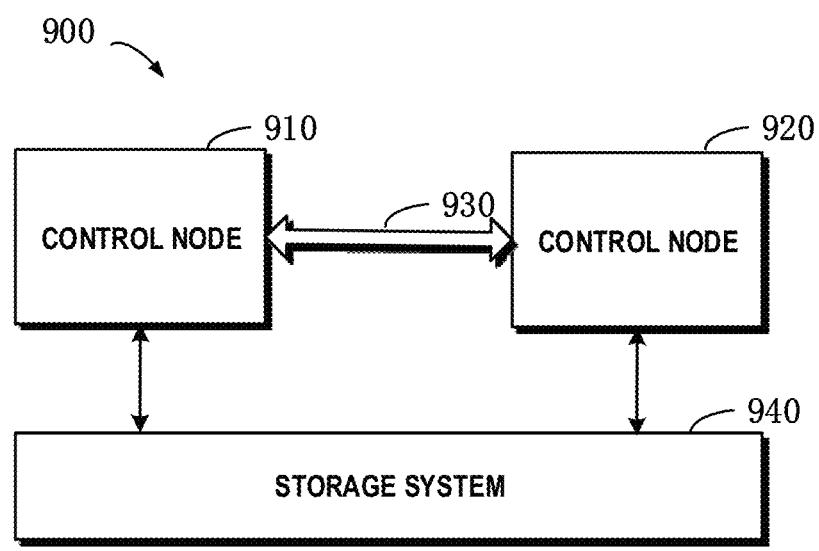
FIG. 9 schematically illustrates a diagram of control nodes for managing a storage system according to one implementation of the present disclosure.

FIG. 9 schematically shows a diagram of a control node for managing a storage system according to one implementation of the present disclosure. As depicted, a storage system 940 may be managed by means of one or more control nodes. Specifically, the storage system 940 may be managed by means of control nodes 910 and 920. A channel 930 for communication may be provided between the two control nodes 910 and 920. During operation of the storage system 940, the two control nodes 910 and 920 may execute a rebuild in parallel.

According to an example implementation of the present disclosure, the multiple stripes that may be rebuilt in parallel may be selected in the following manner. Specifically, a first parallel stripe may be selected from the multiple stripes, and a second parallel stripe may be selected from the multiple stripes based on the coupling degree relationship. It will be appreciated that a coupling degree between the first parallel stripe and the second parallel stripe is less than a coupling degree between the first parallel stripe and a further stripe among the multiple stripes needs to be guaranteed here. In this manner, where the number of stripes which may be rebuilt in parallel has been determined, stripes with a lower coupling degree between them may be selected according to coupling degrees between any two stripes among the multiple stripes, and further the efficiency of rebuild operations is improved.

With reference to FIG. 10A, a detailed description is presented below to how to select P stripes to be rebuilt in parallel in a first round. FIG. 10A schematically shows a diagram 1000A of a coupling degree relationship, based on which stripes to be rebuilt in a first round are selected, according to one implementation of the present disclosure. When P=4, 4 stripes may be selected in each round. Suppose first RS0 is selected, and subsequently three more rebuilt stripes are determined respectively. When determining a second rebuilt stripe, as shown by a dash portion in FIG. 10A, a rebuilt stripe having the smallest coupling degree with RS0 may be selected from RS1, RS2, RS3, RS5 and RS7. At this point, since the coupling degree between RS2 and RS0 is 6 (minimum value), RS2 is selected.

According to an example implementation of the present disclosure, a third parallel stripe is selected from the multiple stripes based on the coupling degree relationship, so that a set coupling degree between the third stripe and a set including the first parallel stripe and the second parallel stripe is smaller than a set coupling degree between a further stripe among the multiple stripes and the set including the first parallel stripe and the second parallel stripe. In this manner, stripes which may be rebuilt in parallel may be selected one after another in increasing order by coupling degree. Therefore, in each round of the parallel rebuild, a lowest conflict degree of read and write operation to various storage devices in the resource pool may be guaranteed.

Continuing the foregoing example, the rebuilt stripes RS0 and RS2 have been selected. Next, a rebuilt stripe having a smallest coupling degree with {RS0, RS2} may be selected from RS1, RS3, RS5 and RS7.

Coupling degree between RS1 and {RS0 and RS2}=CP (RS1, RS0)+CP (RS1, RS2)=8+8=16;

Coupling degree between RS3 and {RS0 and RS2}=CP (RS3, RS0)+CP (RS3, RS2)=10+10=20;

Coupling degree between RS5 and {RS0 and RS2}=CP (RS5, RS0)+CP (RS5, RS2)=7+9=16;

Coupling degree between RS7 and {RS0 and RS2}=CP (RS7, RS0)+CP (RS7, RS2)=8+7=15.

As seen from the foregoing calculations, the coupling degree between RS7 and {RS0 and RS2} is 15 (minimum value), so RS7 may be selected as a third rebuilt stripe. So far the rebuilt stripes RS0, RS2 and RS7 have been selected.

According to an example implementation of the present disclosure, in response to the number of selected parallel stripes being less than a predefined number, a fourth parallel stripe is selected from the multiple stripes based on the coupling degree relationship, so that a set coupling degree between the fourth stripe and a set including selected parallel stripes is smaller than a set coupling degree between a further stripe among the multiple stripes and the set including selected parallel stripes. According to an example implementation of the present disclosure, the number of stripes to be rebuilt in each round of parallel rebuild may be set. In this manner, a coupling degree between to-be-rebuilt stripes which have been selected is lowest, and further it may be guaranteed that each round of rebuild will be completed rapidly.

Next a rebuilt stripe having a smallest coupling degree with {RS0, RS2, RS7} may be selected from RS1, RS3 and RS5.

Coupling degree between RS1 and {RS0, RS2 and RS7}=CP (RS1, RS0)+CP (RS1, RS2)+CP (RS1, RS7)=8+8+9=25;

Coupling degree between RS3 and {RS0, RS2 and RS7}=CP (RS3, RS0)+CP (RS3, RS2)+CP (RS3, RS7)=10+10+6=26;

Coupling degree between RS5 and {RS0, RS2 and RS7}=CP (RS5, RS0)+CP (RS5, RS2)+CP (RS5, RS7)=7+9+10=26.

Since the coupling degree between RS1 and {RS0, RS2 and RS7} is smallest, RS1 may be selected as a fourth rebuilt stripe. At this point, stripes to be rebuilt in a first round include RS0, RS2, RS7 and RS1. Further, since the control nodes 910 and 920 may execute a rebuild in parallel, RS0, RS2, RS7 and RS1 may be rebuilt in parallel by the two control nodes respectively. Specifically, RS0 and RS7 may be assigned to the control node 910, and RS2 and RS1 may be assigned to the control node 920. Alternatively, other assignment may be selected.

How to select 4 stripes which may be rebuilt in parallel in a first round has been described with reference to FIG. 10A. Hereinafter, description will be presented to how to select stripes which may be rebuilt in parallel in a second round with reference to FIG. 10B. Since the 4 stripes RS0, RS1, RS2 and RS7 in the dash area as shown in FIG. 10B have been selected in the first round, a selection is made from the stripes RS3 and RS5 in the second round of operation. In the second round, since there exist only 2 to-be-rebuilt stripes, the number 2 of to-be-rebuilt stripes is less than the parallel index 4, RS3 and RS5 may be selected directly.

According to an example implementation of the present disclosure, if the number of to-be-rebuilt stripes in the second round is larger than 4, according to the method described with reference to FIG. 10A, 4 more stripes may be selected as stripes have been selected in the first round. It will be appreciated although concrete implementations of the present disclosure have been described by taking P=4 as a specific example throughout the context of the present disclosure, in other implementation, the parallel index may be set to other value, and rebuilt stripes may be selected in each round according to the foregoing principles.

Figure 11A:
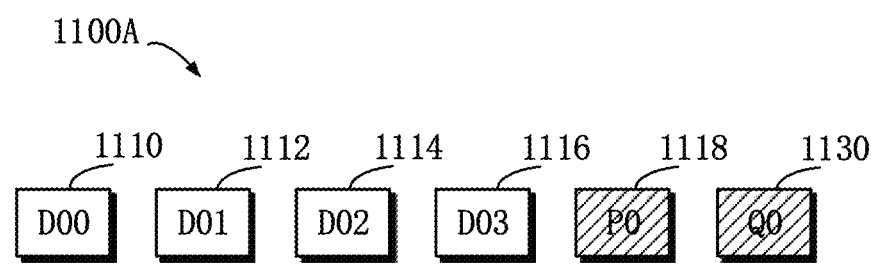
FIGS. 11A and 11B schematically illustrate a diagram of a stripe in a storage system according to the implementations of the present disclosure.

It will be appreciated although concrete examples of the present disclosure have been described in the context of a 4D+1P RAIDS storage system, in other implementation, the foregoing method may be further applied to other type of storage system. FIG. 11A schematically shows a diagram 1100A of a stripe in a storage system according to one implementation of the present disclosure. As depicted, the storage system 430 may be further provided as a 4D+1P+1Q RAID-6 storage system. At this point, in one stripe, extents 1110, 1112, 1114 and 1116 are used for storing data D00, D01, D02 and D03 respectively, and extents 1118 and 1130 are used for storing parity P0 and Q0 respectively. In a storage system using the stripe as shown in FIG. 11A, for each stripe in the storage system, a storage device for rebuilding the stripe may be determined by the foregoing method. Further, P stripes which may be rebuilt in parallel in one round may be selected by the foregoing method. Unlike rebuilding a RAID-5 storage system, concrete rebuilding steps may be executed on the basis of an algorithm for rebuilding a RAID-6 storage system.

Figure 11B:
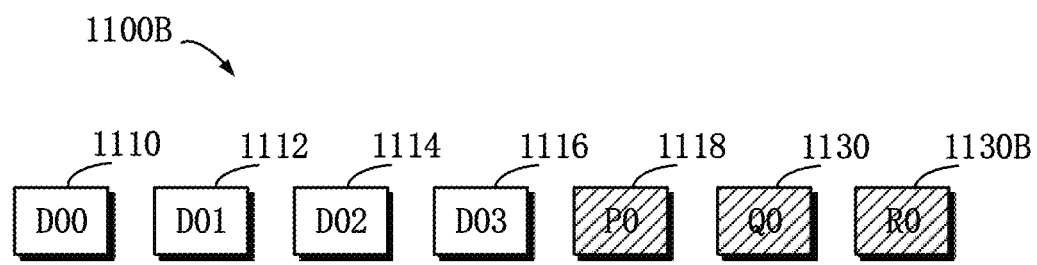

FIG. 11B schematically shows a diagram 1100B of a stripe in a storage system according to one implementation of the present disclosure. As depicted, the storage system 430 may be further provided as a 4D+1P+1Q+1R triple-parity storage system. At this point, in one stripe, extents 1110, 1112, 1114 and 1116 are used for storing data D00, D01, D02 and D03 respectively, and extents 1118, 1130 and 1130B are used for storing parity P0, Q0 and R0 respectively. In a storage system using the stripe as shown in FIG. 11B, for each stripe in the storage system, a storage device for rebuilding the stripe may be determined by the foregoing method. Further, P stripes which may be rebuilt in parallel in one round may be selected by the foregoing method. Unlike rebuilding a RAID-5 storage system, concrete rebuilding steps may be executed on the basis of an algorithm for rebuilding a triple-parity storage system.

According to an example implementation of the present disclosure, there is provided an apparatus for managing a storage system. The apparatus includes: one or more processors; a memory coupled to at least one processor of the one or more processors; computer program instructions stored in the memory which, when executed by the at least one processor, cause the apparatus to execute a method for managing a storage system. The storage system includes multiple stripes, one stripe among the multiple stripes including multiple extents from a group of storage devices in a resource pool associated with the storage system. In the method, in response to a storage device in the group of storage devices failing, multiple stripes in the storage system which are associated with the failed storage device are determined. Next, a first storage device and a second storage device are respectively selected from the group of storage devices. Here the first storage device and the second storage device are a first candidate and a second candidate of storage devices for rebuilding a first stripe and a second stripe among the multiple stripes to form a first rebuilt stripe and a second rebuilt stripe respectively. Then, a coupling degree between the first rebuilt stripe and the second rebuilt stripe is obtained. Here the coupling degree describes a conflict degree of rebuilding the first stripe and the second stripe in parallel. Finally, the first candidate and the second candidate are identified on the basis of the obtained coupling degree.

According to an example implementation of the present disclosure, the coupling degree may be determined on the basis of addresses of various extents included in the first rebuilt stripe and addresses of various extents included in the second rebuilt stripe.

According to an example implementation of the present disclosure, the coupling degree may be determined on the basis of a read and write relationship between various extents included in the first rebuilt stripe during rebuilding and a read and write relationship between various extents included in the second rebuilt stripe during rebuilding.

According to an example implementation of the present disclosure, a reference storage device may be selected from the group of storage device. In this implementation, the reference storage device is a reference candidate of a storage device for rebuilding the second stripe to form a reference rebuilt stripe. Next, a reference coupling degree between the first rebuilt stripe and the reference rebuilt stripe is obtained, and a comparison is made between the coupling degree and the reference coupling degree. If the coupling degree is less than the reference coupling degree, then the first storage device and the second storage device are identified as the first candidate and the second candidate respectively.

According to an example implementation of the present disclosure, a third storage device may be selected from the group of storage devices. In this implementation, the third storage device is a third candidate of a storage device for rebuilding a third stripe among the multiple stripes to form a third rebuilt stripe. Next, a set coupling degree between the third rebuilt stripe and a set including the first rebuilt stripe and the second rebuilt stripe is obtained, and the third candidate is identified on the basis of the obtained set coupling degree.

According to an example implementation of the present disclosure, a candidate storage device for rebuilding each stripe among the multiple stripes to form multiple rebuilt stripes may be determined from the group of storage devices. Subsequently, a coupling degree relationship describing a coupling degree between any two rebuilt stripes among the multiple rebuilt stripes may be obtained. Next, at least two stripes among the multiple stripes may be rebuilt in parallel.

According to an example implementation of the present disclosure, the storage system may include a first control node and a second control node.

According to an example implementation of the present disclosure, at least two stripes are selected from the multiple stripes based on the coupling degree relationship. The at least two stripes selected here may be rebuilt in parallel. Specifically, a first portion and a second portion in the at least two stripes may be rebuilt in parallel using the first control node and the second control node respectively.

According to an example implementation of the present disclosure, a first parallel stripe is selected from the multiple stripes, and a second parallel stripe is selected from the multiple stripes based on the coupling degree relationship. In this implementation, the second parallel stripe may be selected such that a coupling degree between the first parallel stripe and the second parallel stripe is less than a coupling degree between the first parallel stripe and a further stripe among the multiple stripes.

According to an example implementation of the present disclosure, a third parallel stripe is selected from the multiple stripes based on the coupling degree relationship. In this implementation, the third parallel stripe may be selected such that a set coupling degree between the third parallel stripe and a set including the first parallel stripe and the second parallel stripe is less than a set coupling degree between a further stripe among the multiple stripes and the set including the first parallel stripe and the second parallel stripe.

According to an example implementation of the present disclosure, in response to the number of selected parallel stripes being less than a predefined number, a fourth parallel stripe is selected from the multiple stripes based on the coupling degree relationship. The fourth parallel stripe may be selected such that a set coupling degree between the fourth parallel stripe and a set including selected parallel stripes is less than a set coupling degree between a further stripe among the multiple stripes and the set including selected parallel stripes.

According to an example implementation of the present disclosure, there is provided a computer program product being tangibly stored on a non-transient computer readable medium and including machine executable instructions for executing actions of a method according to the present disclosure.

According to an example implementation of the present disclosure, there is provided a computer readable storage medium. The computer readable storage medium has computer readable program instructions stored therein, which, when executed by a processing unit of a machine, cause the machine to implement a method described above.

The flowchart and block diagrams in the Figures illustrate the architecture, functionality, and operation of possible implementations of systems, methods and computer program products according to various implementations of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A method for managing a storage system, the storage system comprising multiple stripes, one stripe among the multiple stripes comprising multiple extents from a group of storage devices in a resource pool associated with the storage system, the method comprising:
   in response to a storage device in the group of storage devices failing, determining multiple stripes in the storage system which are associated with the failed storage device;
   selecting a first storage device and a second storage device from the group of storage devices respectively, the first storage device and the second storage device being a first candidate and a second candidate of storage devices for rebuilding a first stripe and a second stripe among the multiple stripes to form a first rebuilt stripe and a second rebuilt stripe respectively;
   obtaining a coupling degree between the first rebuilt stripe and the second rebuilt stripe, the coupling degree describing a conflict degree of rebuilding the first stripe and the second stripe in parallel, wherein the coupling degree is determined on the basis of whether extents in the first rebuilt stripe and second rebuilt stripe reside on the same storage device; and
   identifying the first candidate and the second candidate on the basis of the obtained coupling degree.

2. The method according to claim 1, wherein the obtaining a coupling degree between the first rebuilt stripe and the second rebuilt stripe comprises:
   determining the coupling degree on the basis of addresses of various extents comprised in the first rebuilt stripe and addresses of various extents comprised in the second rebuilt stripe.

3. The method according to claim 1, wherein the obtaining a coupling degree between the first rebuilt stripe and the second rebuilt stripe further comprises:
   determining the coupling degree on the basis of a read and write relationship between various extents comprised in the first rebuilt stripe during rebuilding and a read and write relationship between various extents comprised in the second rebuilt stripe during rebuilding.

4. The method according to claim 3, further comprising:
   selecting a reference storage device from the group of storage device, the reference storage device being a reference candidate of a storage device for rebuilding the second stripe to form a reference rebuilt stripe;
   obtaining a reference coupling degree between the first rebuilt stripe and the reference rebuilt stripe; and
   in response to the coupling degree being less than the reference coupling degree, identifying the first storage device and the second storage device as the first candidate and the second candidate respectively.

5. The method according to claim 4, further comprising:
   selecting a third storage device from the group of storage devices, the third storage device being a third candidate of a storage device for rebuilding a third stripe among the multiple stripes to form a third rebuilt stripe;
   obtaining a set coupling degree between the third rebuilt stripe and a set comprising the first rebuilt stripe and the second rebuilt stripe; and
   identifying the third candidate on the basis of the obtained set coupling degree.

6. The method according to claim 5, further comprising:
   determining from the group of storage devices a candidate storage device for rebuilding each stripe among the multiple stripes to form multiple rebuilt stripes;
   obtaining a coupling degree relationship describing a coupling degree between any two rebuilt stripes among the multiple rebuilt stripes; and
   rebuilding in parallel at least two stripes among the multiple stripes on the basis of the obtained coupling degree relationship.

7. The method according to claim 6, wherein the storage system comprises a first control node and a second control node, and wherein the rebuilding in parallel at least two stripes among the multiple stripes comprises:
   selecting at least two stripes from the multiple stripes based on the coupling degree relationship; and
   rebuilding in parallel a first portion and a second portion in the at least two stripes using the first control node and the second control node respectively.

8. The method according to claim 7, wherein the selecting at least two stripes from the multiple stripes comprises:
   selecting a first parallel stripe from the multiple stripes; and
   selecting a second parallel stripe from the multiple stripes based on the coupling degree relationship, such that a coupling degree between the first parallel stripe and the second parallel stripe is less than a coupling degree between the first parallel stripe and a further stripe among the multiple stripes.

9. The method according to claim 8, wherein the selecting at least two stripes from the multiple stripes further comprises:
   selecting a third parallel stripe from the multiple stripes based on the coupling degree relationship, such that a set coupling degree between the third parallel stripe and a set comprising the first parallel stripe and the second parallel stripe is less than a set coupling degree between a further stripe among the multiple stripes and the set comprising the first parallel stripe and the second parallel stripe.

10. The method according to claim 9, wherein the selecting at least two stripes from the multiple stripes further comprises:
    in response to the number of selected parallel stripes being less than a predefined number, selecting a fourth parallel stripe from the multiple stripes based on the coupling degree relationship, such that a set coupling degree between the fourth parallel stripe and a set comprising selected parallel stripes is less than a set coupling degree between a further stripe among the multiple stripes and the set comprising selected parallel stripes.

11. An apparatus for managing a storage system, comprising:
    a set of processors;
    a memory coupled to the set of processors; the memory storing computer program instructions which, when executed by the set of processors, cause the apparatus to execute a method for managing a storage system, the storage system including multiple stripes, one stripe among the multiple stripes including multiple extents from a group of storage devices in a resource pool associated with the storage system, the method comprising:

in response to a storage device in the group of storage devices failing, determining multiple stripes in the storage system which are associated with the failed storage device;

selecting a first storage device and a second storage device from the group of storage devices respectively, the first storage device and the second storage device being a first candidate and a second candidate of storage devices for rebuilding a first stripe and a second stripe among the multiple stripes to form a first rebuilt stripe and a second rebuilt stripe respectively;

obtaining a coupling degree between the first rebuilt stripe and the second rebuilt stripe, the coupling degree describing a conflict degree of rebuilding the first stripe and the second stripe in parallel, wherein the coupling degree is determined on the basis of whether extents in the first rebuilt stripe and second rebuilt stripe reside on the same storage device; and identifying the first candidate and the second candidate on the basis of the obtained coupling degree.

12. The apparatus according to claim 11, wherein the obtaining a coupling degree between the first rebuilt stripe and the second rebuilt stripe comprises:

determining the coupling degree on the basis of addresses of various extents comprised in the first rebuilt stripe and addresses of various extents comprised in the second rebuilt stripe.

13. The apparatus according to claim 11, wherein the obtaining a coupling degree between the first rebuilt stripe and the second rebuilt stripe further comprises:

determining the coupling degree on the basis of a read and write relationship between various extents comprised in the first rebuilt stripe during rebuilding and a read and write relationship between various extents comprised in the second rebuilt stripe during rebuilding.

14. The apparatus according to claim 13, wherein the method further comprises:

selecting a reference storage device selected from the group of storage device, the reference storage device being a reference candidate of a storage device for rebuilding the second stripe to form a reference rebuilt stripe;

obtaining a reference coupling degree between the first rebuilt stripe and the reference rebuilt stripe; and in response to the coupling degree being less than the reference coupling degree, identifying the first storage device and the second storage device as the first candidate and the second candidate respectively.

15. The apparatus according to claim 14, wherein the method further comprises:

selecting a third storage device from the group of storage devices, the third storage device being a third candidate of a storage device for rebuilding a third stripe among the multiple stripes to form a third rebuilt stripe;

obtaining a set coupling degree between the third rebuilt stripe and a set comprising the first rebuilt stripe and the second rebuilt stripe; and identifying the third candidate on the basis of the obtained set coupling degree.

16. The apparatus according to claim 15, wherein the method further comprises:

determining from the group of storage devices a candidate storage device for rebuilding each stripe among the multiple stripes to form multiple rebuilt stripes;

obtaining a coupling degree relationship describing a coupling degree between any two rebuilt stripes among the multiple rebuilt stripes; and rebuilding in parallel at least two stripes among the multiple stripes on the basis of the obtained coupling degree relationship.

17. The apparatus according to claim 16, wherein the storage system comprises a first control node and a second control node, and wherein the rebuilding in parallel at least two stripes among the multiple stripes comprises:

selecting at least two stripes from the multiple stripes based on the coupling degree relationship; and rebuilding in parallel a first portion and a second portion in the at least two stripes using the first control node and the second control node respectively.

18. The apparatus according to claim 17, wherein the selecting at least two stripes from the multiple stripes comprises:

selecting a first parallel stripe from the multiple stripes; and selecting a second parallel stripe from the multiple stripes based on the coupling degree relationship, such that a coupling degree between the first parallel stripe and the second parallel stripe is less than a coupling degree between the first parallel stripe and a further stripe among the multiple stripes.

19. The apparatus according to claim 18, wherein the selecting at least two stripes from the multiple stripes further comprises:

selecting a third parallel stripe from the multiple stripes based on the coupling degree relationship, such that a set coupling degree between the third parallel stripe and a set comprising the first parallel stripe and the second parallel stripe is less than a set coupling degree between a further stripe among the multiple stripes and the set comprising the first parallel stripe and the second parallel stripe.

20. The apparatus according to claim 19, wherein the selecting at least two stripes from the multiple stripes further comprises:

in response to the number of selected parallel stripes being less than a predefined number, selecting a fourth parallel stripe from the multiple stripes based on the coupling degree relationship, such that a set coupling degree between the fourth parallel stripe and a set comprising selected parallel stripes is less than a set coupling degree between a further stripe among the multiple stripes and the set comprising selected parallel stripes.

21. A computer program product having a non-transitory computer readable medium which stores a set of instructions for managing a storage system, the storage system including multiple stripes, one stripe among the multiple stripes including multiple extents from a group of storage devices in a resource pool associated with the storage system; the set of instructions, when carried out by computerized circuitry, causing the computerized circuitry to perform a method of:

in response to a storage device in the group of storage devices failing, determining multiple stripes in the storage system which are associated with the failed storage device;

selecting a first storage device and a second storage device from the group of storage devices respectively, the first storage device and the second storage device being a first candidate and a second candidate of storage devices for rebuilding a first stripe and a second stripe among the multiple stripes to form a first rebuilt stripe and a second rebuilt stripe respectively;

obtaining a coupling degree between the first rebuilt stripe and the second rebuilt stripe, the coupling degree describing a conflict degree of rebuilding the first stripe and the second stripe in parallel, wherein the coupling degree is determined on the basis of whether extents in the first rebuilt stripe and second rebuilt stripe reside on the same storage device; and identifying the first candidate and the second candidate on the basis of the obtained coupling degree.

22. The method of claim 1, wherein obtaining the coupling degree between the first rebuilt stripe and the second rebuilt stripe comprises obtaining larger coupling degree values in response to larger numbers of overlapping storage devices in the first rebuilt stripe and the second rebuilt stripe.

\* \* \* \* \*